United States Patent [19]

Schreuders

[11] Patent Number: 5,092,209

[45] Date of Patent: * Mar. 3, 1992

[54] METHOD AND DEVICE FOR CUTTING GAS CONCRETE

[75] Inventor: Willem J. Schreuders, Staphorst, Netherlands

[73] Assignee: Durox Gasbeton B.V., Vuren, Netherlands

[*] Notice: The portion of the term of this patent subsequent to Sep. 11, 2007 has been disclaimed.

[21] Appl. No.: 516,182

[22] Filed: Apr. 30, 1990

Related U.S. Application Data

[62] Division of Ser. No. 149,677, Jan. 28, 1988, Pat. No. 4,955,272.

[30] Foreign Application Priority Data

Feb. 4, 1987 [NL] Netherlands ............... 8700271

[51] Int. Cl.⁵ ............................................. B28B 11/14
[52] U.S. Cl. ................................... 83/425.2; 83/427; 83/577; 83/618; 83/628; 83/639.5; 83/651.1
[58] Field of Search ............ 83/651.1, 56, 171, 356.3, 83/356.2, 575, 577, 618, 625, 628, 629, 639.5, 425.2, 427; 425/308, 316; 264/157, 297.9

[56] References Cited

U.S. PATENT DOCUMENTS

| | | |
|---|---|---|
| 2,115,102 | 4/1938 | Gottfried et al. |
| 3,919,372 | 11/1975 | Vogele ........................... 425/316 X |
| 4,018,117 | 4/1977 | Patterson ...................... 83/651.1 X |
| 4,574,677 | 3/1986 | Hühne ............................ 83/651.1 X |
| 4,608,893 | 9/1986 | Hühne ............................ 83/651.1 X |
| 4,646,598 | 3/1987 | Lineberry et al. ............. 83/651.1 X |
| 4,702,138 | 10/1987 | Hattori et al. ................. 83/651.1 X |

Primary Examiner—Douglas D. Watts
Assistant Examiner—Rinaldi Rada
Attorney, Agent, or Firm—Watson, Cole, Grindle & Watson

[57] ABSTRACT

In order to decrease shocks and vibrations to plastic gas concrete during cutting thereof with wires, the cutting wires are guided and driven separately from one another in a cutting frame.

17 Claims, 7 Drawing Sheets

METHOD AND DEVICE FOR CUTTING GAS CONCRETE

This application is a divisional application of application Ser. No. 149,677, filed Jan. 28, 1988, now U.S. Pat. No. 4,955,272.

The invention relates to a method for cutting gas concrete and like plastic material by means of cutting wires driven reciprocally in their longitudinal direction.

The cutting process in gas concrete fabrication is costly because of the investment in an expensive cutting device and the personnel thereby required. It would be desirable to make the relative speed between the block of gas concrete for cutting and the cutter frame—that is, the material carrying speed—high to thus shorten the cutting time. This cutting speed is however limited, since when the cutting speed is too high there is greater danger of the cutting wire breaking and/or since the then resulting cut surface is extremely uneven and/or extremely rough. The cutting forces which occur with excessive material carrying speeds lead to violent vibrations and shocks which are not acceptable either for the structure of the soft gas concrete or for the usually complicated and costly cutting device.

The invention provides a new method with which a block of gas concrete can be cut more rapidly and/or with a finer surface structure. To this end the average cutting speed of the cutting wire in its longitudinal direction is selected so as to be at least six times and preferably seven times and most preferably more than eight times higher than the material carrying speed. Using high frequencies of for example more than 10 Hz., preferably more than 25 Hz. and most preferably more than 50 Hz., it has been found that very smooth cut surfaces can be realized at high material carrying speeds without cutting wire breakage. In an especially practical method according to the invention the wire ends are held in position by means of wire end holders which are guided in their lengthwise direction relative to a cutting structure and which are dirven reciprocally relative to the cutting structure. As a result the cutting wires can be driven with high frequency of preferably more than 10 Hz. and more preferably with a frequency in the order of magnitude of 50 Hz. without this leading to violent vibrations or jolts. With this high cutting wire speed the cutting speed can be considerably increased, while the surface structure obtained can be made so flat and smooth that even wallpaper can be adhered thereto without interposing of a plaster layer.

The invention also relates to and provides a device for performing the method according to the invention.

Mentioned and other features of the invention will be made apparent in the description following hereinafter of preferred embodiments of a device according to the invention.

Figure 1:
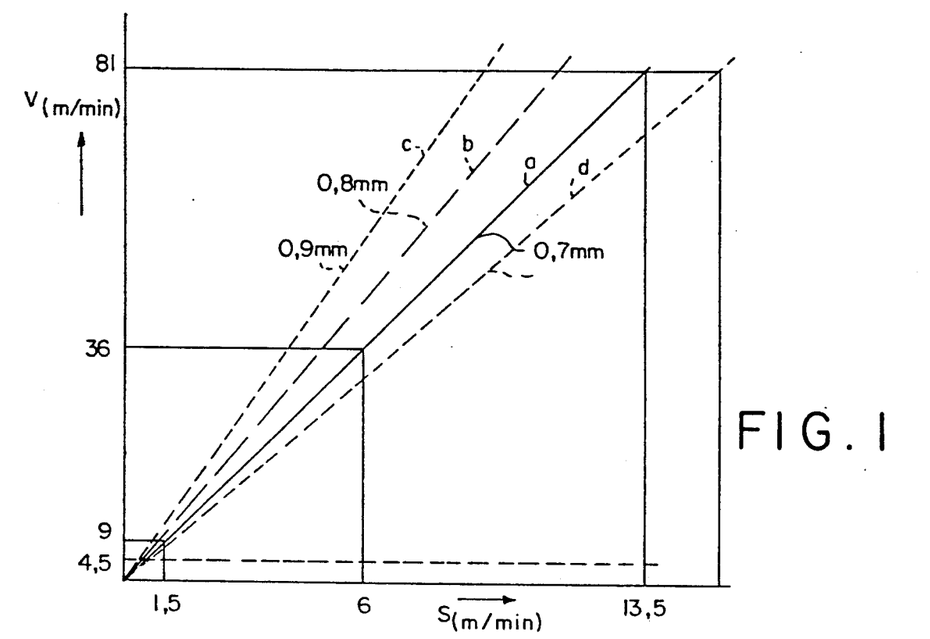
FIG. 1 shows a graph which provides an insight into the speed ratios during the cutting process.

FIG. 1 shows in a diagram the ratio between the average reciprocating cutting speed V of the cutting wire in its lengthwise direction in meters per minute during a forward stroke and a return stroke on the one side and the material carrying speed S in meters per minute on the other. The material carrying speed is the relative speed between the block of gas concrete for cutting and the cutter frame. In the known state of the art the cutting speed S is 4.5 m/min. It has been found in tests that if, with a cutting wire with a diameter of 0.7 mm, the ratio V/S is greater than the value indicated by the line a, a smooth surface is obtained. The lines b and c indicate the limits in the case of cutting wires of respectively 0.8 and 0.9 mm. Tests further show that when two cutting wires are disposed in the same cutting plane one behind the other the boundary line d runs less steeply than when only one cutting wire is used in the same cutting plane.

Figure 2:
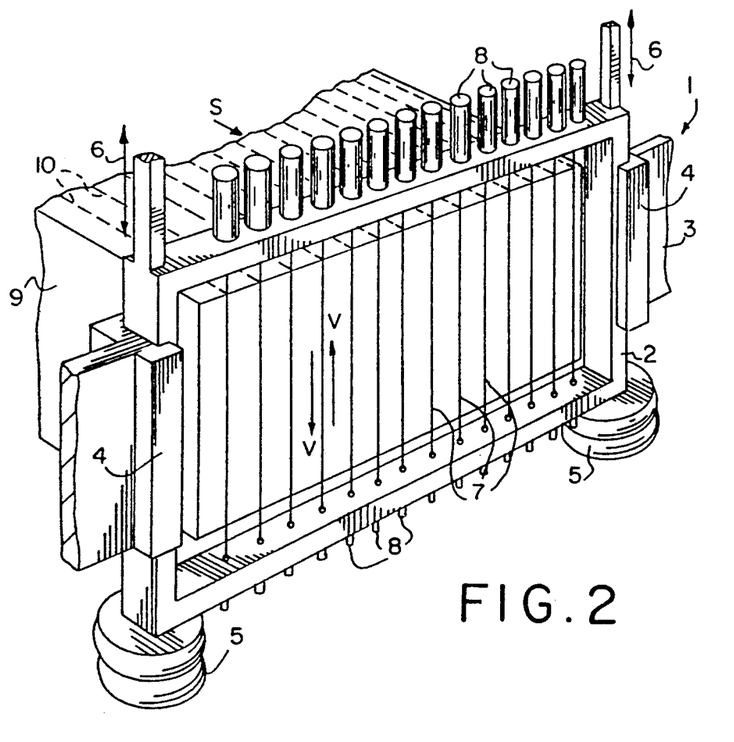
FIG. 2 is a schematic, perspective view of a part of a device according to the invention.

The current invention proposes to employ a considerably higher cutting speed V, preferably 9 m/min, so that the material carrying speed S can be markedly increased. This can be achieved with a cutting device 1 from FIG. 2, of which a cutter frame 2 is guided vertically relative to a stationary frame 3 by means of guidings 4 and which supports on air bellows 5 which force cutter frame 2 to its highest position. Drive means (not shown) drive the cutter frame as according to arrows 6 vertically up and down over a stroke of for instance 15 mm with a frequency such that an average speed per stroke of 9 m/min is achieved. Accommodated in the cutter frame 2 are cutting wires 7 which are held in place by means of cutting wire holders 8. When a block of gas concrete 9 for cutting is transported at a material carrying speed S through cutter frame 2 by means of carrying means (not drawn), it is cut by the cutting wires 7 along cutting planes 10. Since the weight of the cutter frame 2 is balanced by means of the bellows 5 it can move up and down without too many shocks at the mentioned speed V of 9 m/min; that is, with a frequency of about 10 Hz.

Figure 3:
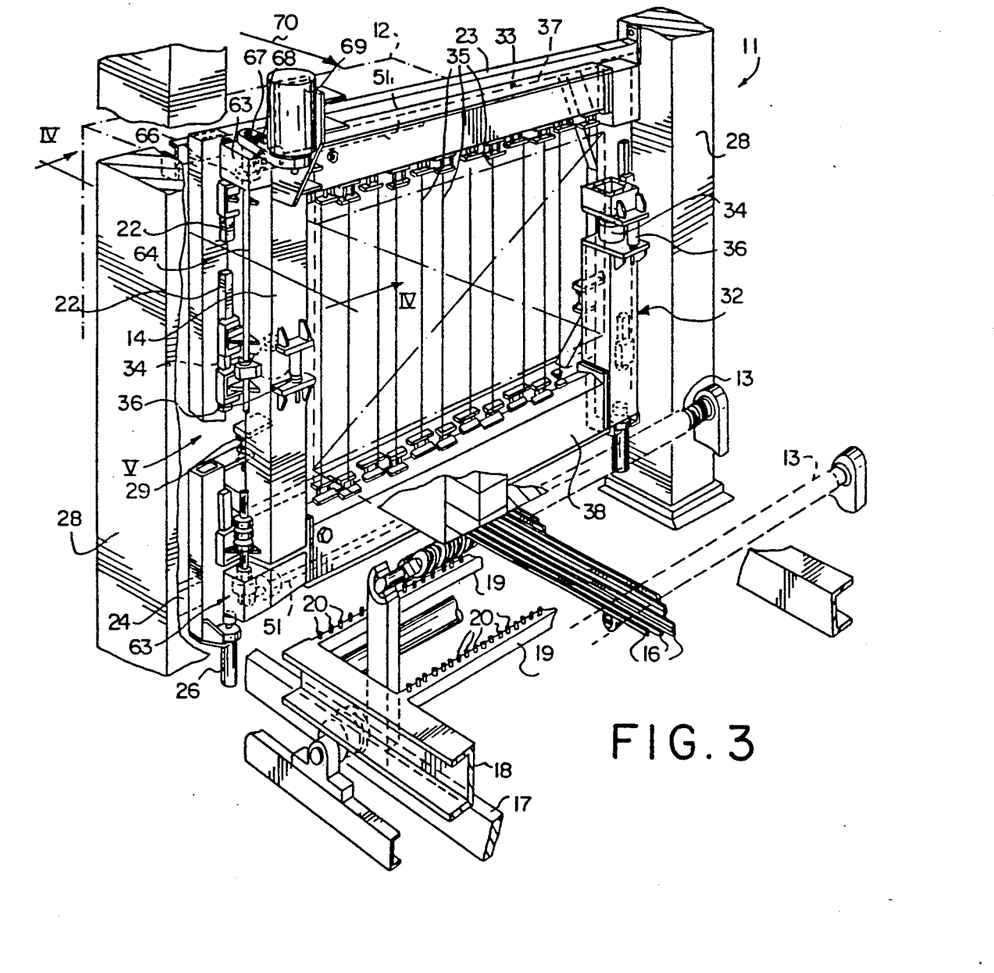
FIG. 3 is a perspective view of a preferred embodiment of a device according to the invention in practical operation.
Figure 4:
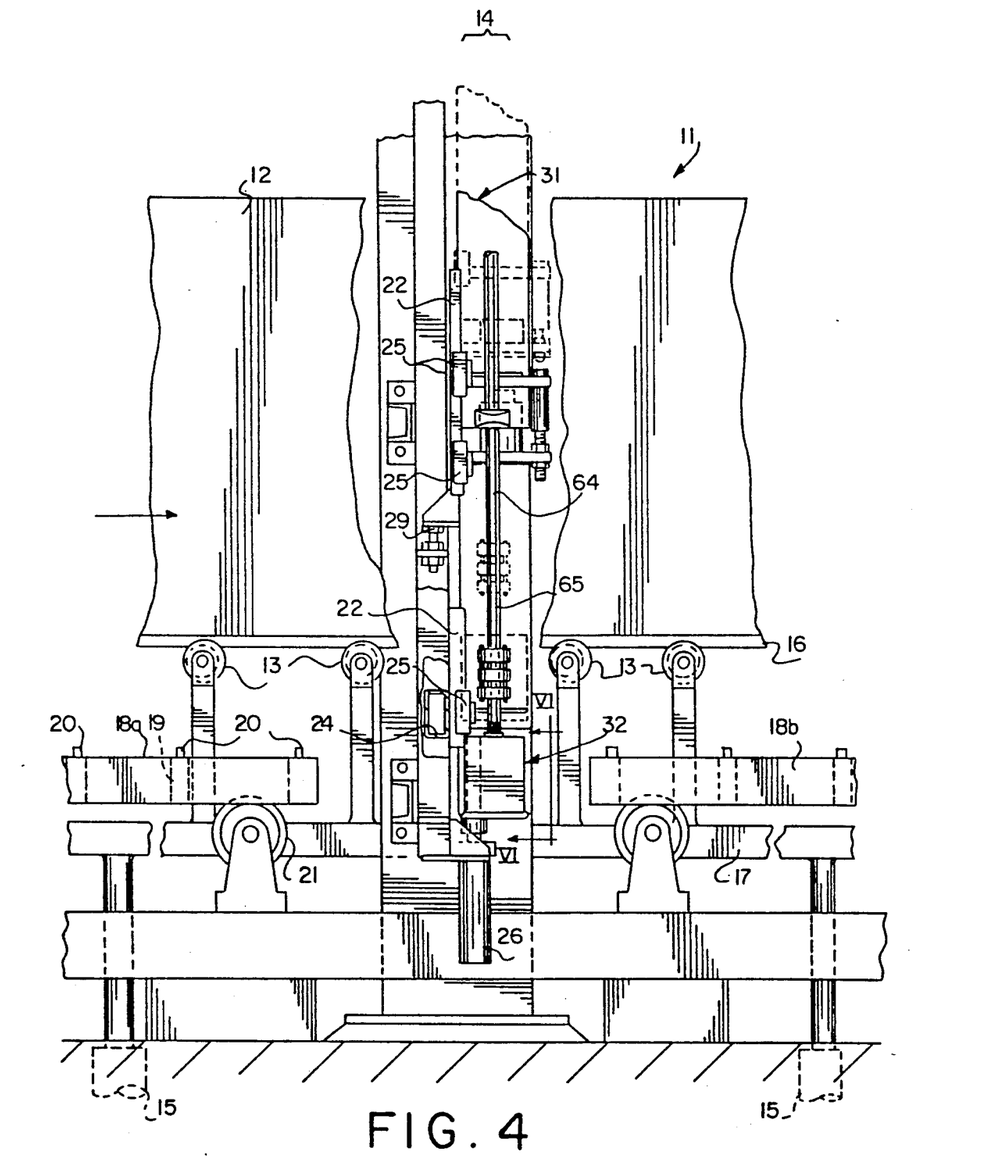
FIG. 4 is a view along arrows IV—IV from FIG. 3.
Figure 5:
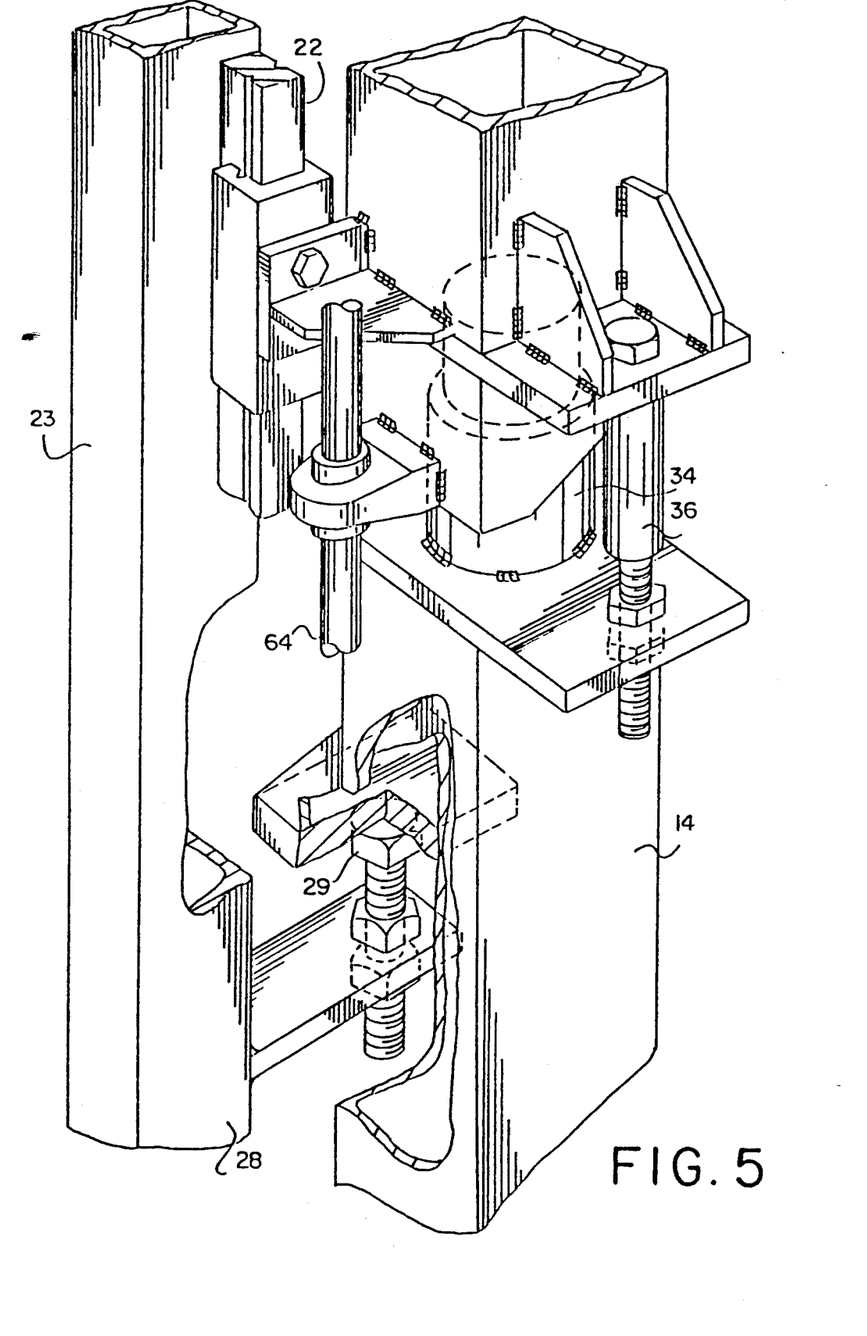
FIG. 5 shows on a larger scale a perspective view of detail V from FIG. 3.

In the preferred embodiment of the device 11 according to the invention, a block 12 of plastic gas concrete for cutting is supported by rods 16 which lie on grooved rolls 13 which are mounted for rotation both in front of and behind a cutting structure 14 (FIG. 4) on a bearing frame 17 which can be moved up and down by means of hydrocylinders 15. One or more rolls 13 are driven to cause the block 12 to move during the cutting according to arrow 70 through the cutting structure 14 at a material carrying speed S.

A block 12 for cutting is supplied by means of a grid 18a which has cross beams 19 with vertical pins 20, between which lie loose rods 16. Block 12 rests on these rods 16 when grid 18a arrives in FIG. 4 at the left hand side of cutting structure 14 while the grid rolls over freely rotating rolls 21 that are in a stationary disposition. In this position of grid 18a, while an empty grid 18b is likewise located on the right hand side of cutting structure 14, bearing frame 17 is raised, whereby block 12 is lifted together with rods 16 from the grid 18a and taken up by means of the grooved rolls 13. Cutting structure 14 is connected to fixed pillars 28 to which horizontal frame beams 23 and 24 are firmly attached at a level such that they do not impede the passage of block 12 and grids 18. Also firmly attached to pillars 28 are vertical guidings 22 which serve for vertical guiding of slides 25 of a cutting structure 14 that can be raised by means of hydrocylinders 26. This lifting is necessary to carry the empty grid 18a over rolls 21 to the postion of grid 18b where it can pick up a cut block and be subsequently carried away. When cutting structure 14 is lowered it comes to rest on adjustable stops 29.

Cutting structure 14 consists of a U-shaped upper frame 33 and a U-shaped underframe 32 which can be driven apart by means of hydrocylinders 34 for the purpose of tensioning cutting wires 35 and which can be fixed in position after tensioning by means of screw connections 36. Located in horizontal box girders 37 and 38 of upper frame 33 and underframe 32 respectively are identical drive means 39 which cooperate with identical means 40 for holding cutting wires in position, so that only the box girder 38 with fittings is described with reference to FIGS. 6-9.

Figure 6:
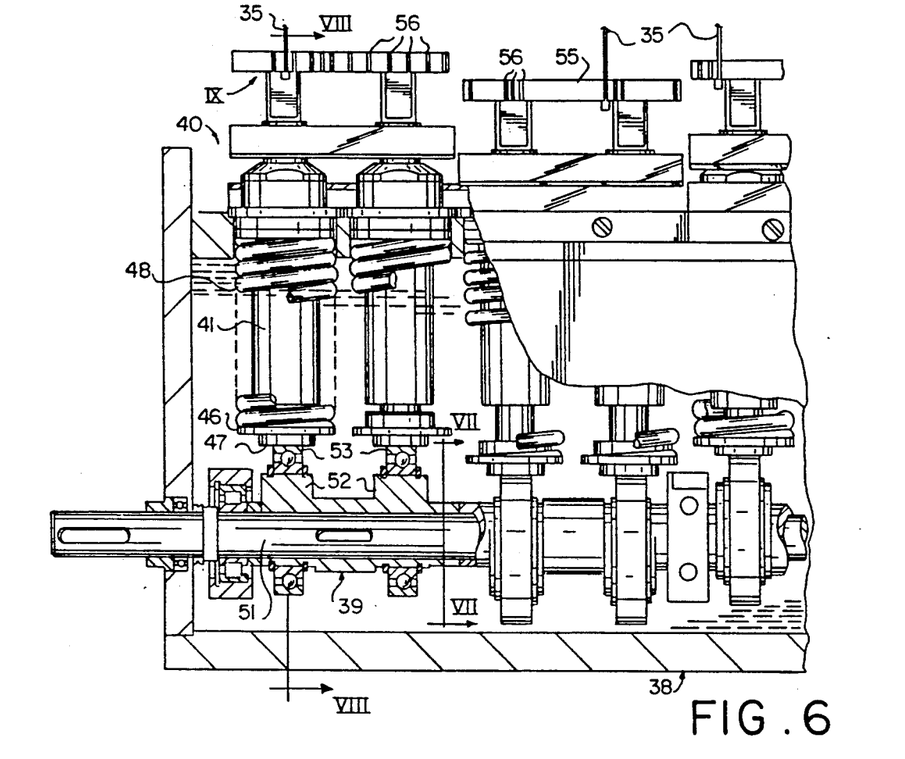
FIG. 6 shows on a larger scale a broken away view along arrows VI—VI from FIG. 4.
Figure 7:
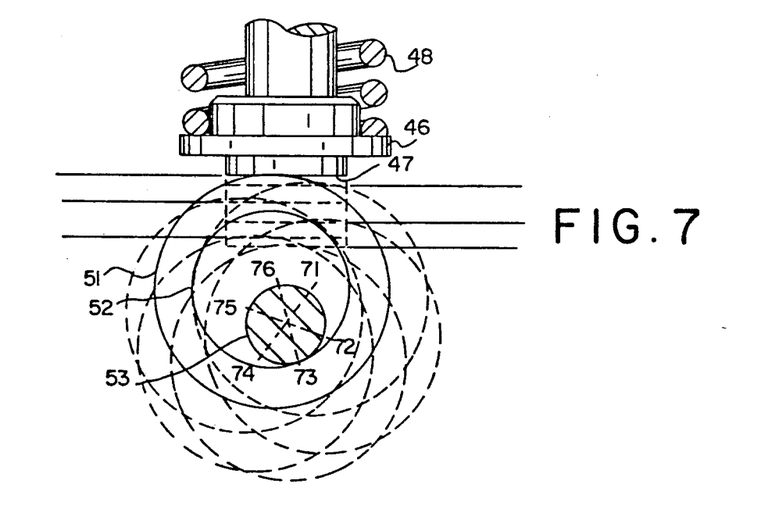
FIG. 7 shows on a larger scale a schematic view along arrows VII—VII from FIG. 6.

Accommodated in box girder 38 and attached thereto with flanges 43 and bolts 44 are vertical guide bushings 41, each with a guide lining 42. Guided therein is a guide pin 45 which is provided with a support disc 46 having a flat, horizontal support face 47. Located between flange 43 and support disc 46 is a spiral spring 48 which forces guide pin 45 downward. Arranged on the outer end of guide pin 45 is a sealing ring 49. The girder 38 has an oil chamber 50 in which a camshaft 51 is mounted for rotation. This chamshaft 51 has exactly round eccentric cams 52 which are surrounded by roller or ball bearings 53.

These bearings 53 each co-act with a support face 47. Two cams 52 at a time are arranged pair-wise in the same angular position 71-76 so that they can co-operate with a pair of guide pins 45 which follow behind each other and which bear a common wire end holder 55. The pairs of cams 52 are distributed evenly over the periphery so that the camshafts 51 are balanced, particularly with respect to the cutting reaction forces exercised thereon by the cutting wires 35.

Figure 8:
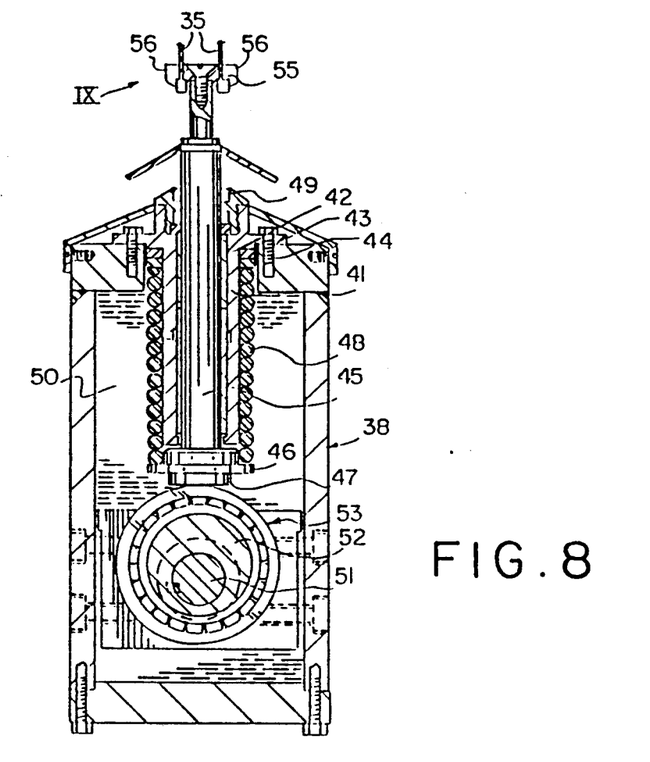
FIG. 8 is a section along lines VIII—VIII from FIG. 6.
Figure 9:
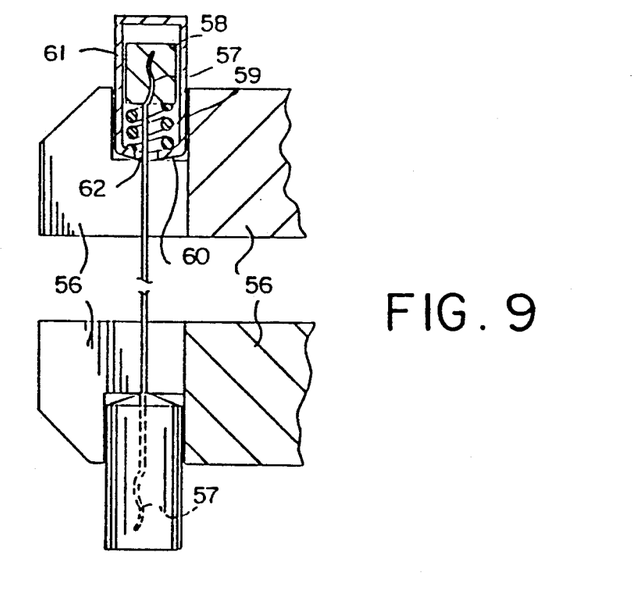
FIG. 9 shows detail IX from FIG. 6 on a larger scale.

Each cutting wire holder 55 consists of a bridge piece which has slots 56 arranged at the same places on either side for accommodating two cuttinhg wires 35 in each case (FIG. 8). These slots 56 are chosen such that the cutting wires 35 can be positioned at the mutual pitch distances that occur. Each of both cutting wire ends 57 is accommodated in a metal plug 58 which supports via a compression spring 59 on the bottom 60 of a housing 61 provided with a passage 62 (FIG. 9).

Both camshafts 51 are connected to each other via cone drive gears 63 by means of a vertical shaft 65, the upper end of which takes the form of a spline shaft 64 and can slide vertically relative to a bevel gear 66 and a drive wheel 67 which are each provided with a spline bore. Drive wheel 67 is driven by a motor 69 via a tooth belt 68.

When the upper frame 33 is moved downward relative to underframe 32 by means of hydrocylinders 34, cutting wires 35 can easily be fixed to the wire end holders 55. Cutting wires 35 are then tensioned by forcing apart of the frames 33 and 32. Both camshafts 51 remain continuously in the same position during their rotation, so that the distance between the both wire end holders 55 holding the same cutting wire 35 in position has a fixed value.

Figure 10:
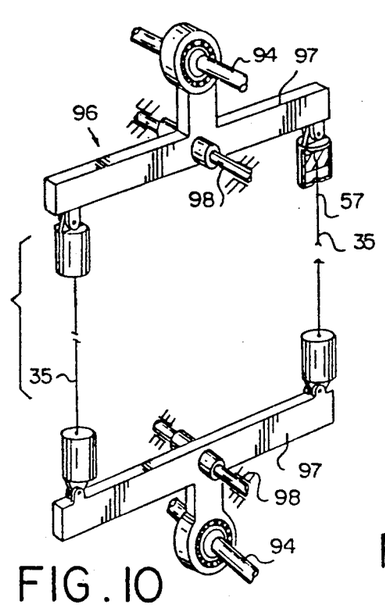
FIGS. 10 and 11 each show a detail in each case of different cutting devices according to the invention.

In the cutting device 96 from FIG. 10 wire ends 57 of cutting wires 35 are tensioned between two arms 97 mounted for pivoting on shafts 98, these arms being driven synchronously by two mutually coupled camshafts 94.

Figure 11:
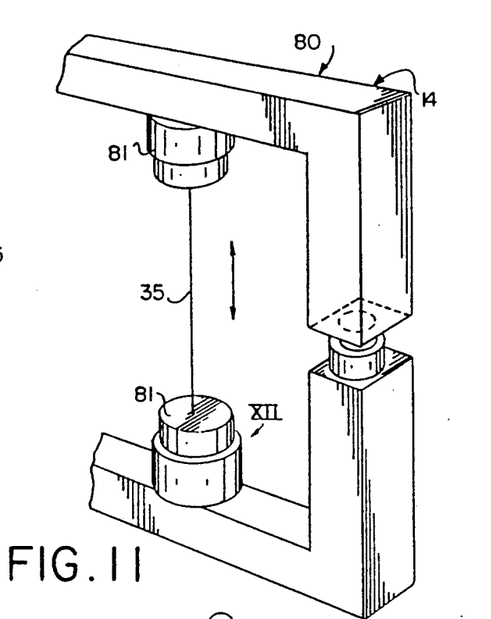
Figure 12:
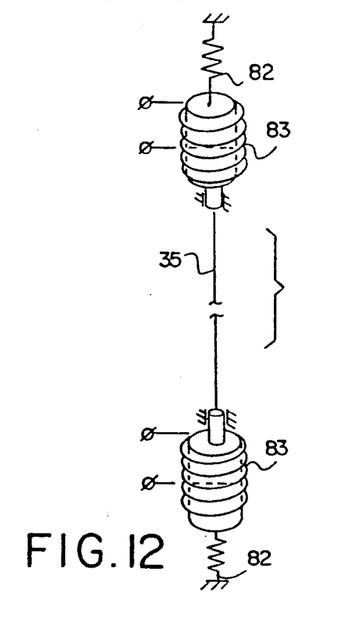
FIG. 12 is a perspective, schematic view of detail XII from FIG. 11.

In the cutting device 80 from FIGS. 11 and 12 each cutting wire 35 is tensioned between two wire end holders 81 which are attached via draw springs 82 to cutting structure 14. As a result of periodic synchronous actuation in opposing directions of two magnet coils 83 the cutting wire 35 is moved up and down with high frequency and at high cutting speed V.

Figure 13:
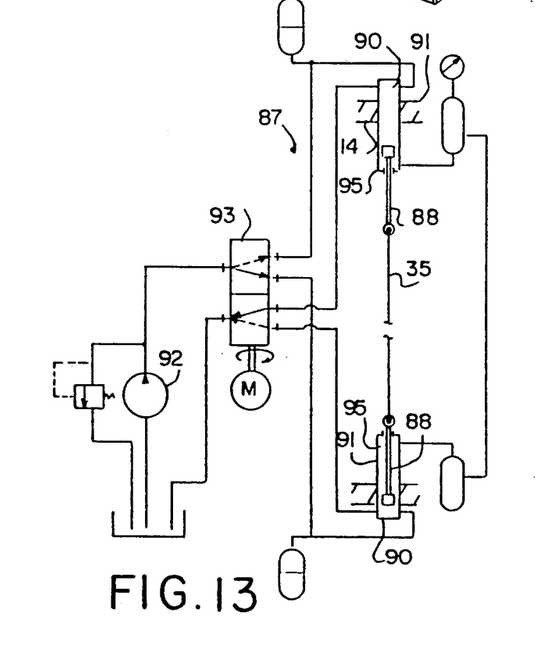
FIG. 13 is a diagram of yet another cutting device according to the invention.

FIG. 13 shows the principle of a cutting device 87, whereby in each case a cutting wire 35 is tensioned between two piston rods 88 of a pneumatic drive system. The tensioning of the cutting wire 35 is carried out by means of pneumatic chambers 95. The drive chambers 90 of the hydrocylinders 91 are fed by a liquid pump 92 via a rotary diverter valve 93 such that both piston rods 88 move up and down synchronously with a cutting speed V, while a block of gas concrete moves in a manner not illustrated through the cutting structure with a material carrying speed S.

I claim:

1. An apparatus for cutting gas concrete material in its plastic state, comprising at least a carrier accommodating a block for cutting, a standing cutting structure normally in a path of the carrier, first drive means for driving the material along the path over the carrier through said cutting structure, a plurality of cutting wires arranged in said cutting structure such that ends of the wires are held in place on said cutting structure by means of wire end holders, second drive means for reciprocal upward and downward driving of said cutting wires in their longitudinal direction, means for forcing said cutting structure to a position clearing the carrier, said second drive means driving the cutting wires of an average velocity of at least six times the velocity of which said first drive means drives the material along the path over the carrier.

2. Apparatus as defined in claim 1 wherein the wires are reciprocated at a frequency in the range of about 10–50 Hz.

3. Apparatus as defined in claim 1 wherein the cutter structure comprises a pair of frames reciprocally guiding said plurality of wire end holders in which opposite ends of the cutting wires are held, said second drive means simultaneously driving the wire end holders so that the wires simultaneously reciprocate relative to the frames.

4. Apparatus as defined in claim 1 wherein said pair of frames comprises a pair of relatively inverted U-frames and said apparatus further comprises means for moving the U-frames toward and away from each other to facilitate replacement of wires and to tension the wires.

5. Apparatus as defined in claim 1 wherein the cutting wires are arranged in two parallel planes.

6. Apparatus as defined in claim 1 wherein each cutting wire of a series of said plurality of cutting wires is held in position between two wire end holders which are both synchronously driven reciprocally by the reciprocating drive means.

7. Apparatus as defined in claim 1 wherein both the wire end holders holding in position at least the same cutting wire are driven mechanically by the drive means for reciprocal driving, wherein said drive means for reciprocal driving comprises two sets of drive means coupled to each other by means of a cone drive gear.

8. Apparatus as defined in claim 7 wherein each wire end holder extends over some distance in a plane of the cutting structure transversely of a cutting wire direction and has in a transverse direction a series of attachment locations for a wire end, that said wire end holder is guided for sliding in said cutting structure in lengthwise direction of the cutting wire by means of two slide bearings disposed adjacent to each other, in which a holder part is slidably accommodated, whereby each holder part cooperates with a cam of a camshaft, said camshaft being part of said means for reciprocal driving.

9. Apparatus as defined in claim 7 wherein wire end holders are driven reciprocally in the cutting wire direction by means of magnet coils, said magnet coils defining said drive means for reciprocal driving.

10. Apparatus as defined in claim 7 wherein the wire end holders are driven reciprocally in the cutting wire direction by a hydraulic drive device, said hydraulic drive device defining said drive means for reciprocal driving.

11. Apparatus as defined in claim 1 wherein at least one of said wire end holders is driven by said drive means for reciprocal driving, wherein said drive means for reciprocal driving comprises at least one camshaft.

12. Apparatus as defined in claim 11 wherein the camshaft is provided close to at least one round, eccentric cam with a bearing ring mounted thereon.

13. Apparatus as defined in claim 12 wherein the bearing ring co-operates with a substantially flat support face of a slidable guided wire end holder.

14. Apparatus as defined in claim 11 wherein cams for driving of wire end holders are circular and offset relative to the camshaft axis.

15. Apparatus as defined in claim 11, wherein at least one said wire end holder is guided for sliding in line with the wire in a slide bearing accommodated in a lubricating oil chamber in which is also disposed said camshaft driven for rotation which co-operates with a support face of said wire end holder, said support face forced by means of a spring in a direction towards said camshaft.

16. Apparatus as defined in claim 1 wherein wire ends of at least two cutting wires are disposed one behind the other in the same cutting plane and are fixed to a common wire end holder.

17. Apparatus as in claim 1, wherein said second drive means drives said cutting wires at a cyclical rate of between about 10 and about 50 Hz.

* * * * *